United States Patent [19]

Hashimoto et al.

[11] Patent Number: 4,974,565
[45] Date of Patent: Dec. 4, 1990

[54] FUEL SWIRL GENERATION TYPE FUEL INJECTION VALVE AND DIRECT FUEL INJECTION TYPE SPARK IGNITION INTERNAL COMBUSTION ENGINE MOUNTED WITH THE FUEL INJECTION VALVE

[75] Inventors: Eiji Hashimoto, Susono; Daisaku Sawada, Gotenba; Shizuo Sasaki, Susono; Yoshiyuki Tamaki, Susono; Masaki Mitsuyasu, Susono, all of Japan

[73] Assignee: Toyota Jidosha Kabushiki Kaisha, Aichi, Japan

[21] Appl. No.: 313,484

[22] Filed: Feb. 22, 1989

[30] Foreign Application Priority Data

Feb. 26, 1988 [JP] Japan ............................. 63-23724[U]
Mar. 9, 1988 [JP] Japan ............................. 63-30391[U]
Apr. 25, 1988 [JP] Japan ............................. 63-100127

[51] Int. Cl.⁵ ............................................. F02B 3/00
[52] U.S. Cl. ............................. 123/299; 239/533.12; 239/464
[58] Field of Search ... 123/299; 239/464, 533.3–533.12

[56] References Cited

U.S. PATENT DOCUMENTS

| | | | |
|---|---|---|---|
| 3,195,520 | 7/1965 | Simko . | |
| 3,398,936 | 8/1968 | Delano | 239/533.11 |
| 4,407,457 | 10/1983 | Seifert | 239/533.12 |
| 4,528,951 | 7/1985 | Yamada | 239/533.4 |
| 4,629,127 | 12/1986 | Kawamura et al. | 239/533.12 |
| 4,721,253 | 1/1988 | Noguchi et al. | 239/464 |

FOREIGN PATENT DOCUMENTS

| | | | |
|---|---|---|---|
| 55-97129 | 7/1980 | Japan . | |
| 57-43323 | 2/1982 | Japan . | |
| 58-29162 | 2/1983 | Japan . | |
| 0015668 | 1/1984 | Japan | 239/464 |
| 60-261975 | 12/1985 | Japan . | |
| 61-167116 | 7/1986 | Japan . | |
| 61-171869 | 10/1986 | Japan . | |
| 62-48916 | 3/1987 | Japan . | |
| 62-113822 | 5/1987 | Japan . | |
| 62-87127 | 6/1987 | Japan . | |
| 62-87169 | 6/1987 | Japan . | |
| 62-90980 | 6/1987 | Japan . | |
| 62-121827 | 6/1987 | Japan . | |
| 62-139921 | 6/1987 | Japan . | |
| 2074234 | 10/1981 | United Kingdom | 239/533.9 |

Primary Examiner—Andrew M. Dolinar
Assistant Examiner—M. Macy
Attorney, Agent, or Firm—Oliff & Berridge

[57] ABSTRACT

A fuel injection valve includes a fuel swirl generation device, a main fuel injection hole having a comparatively large diameter, and a subsidiary fuel injection hole having a comparatively small diameter. The inclination of the main fuel injection hole with respect to an axis of the fuel injection valve is small so that a fuel swirl remains in the fuel injected therethrough. The inclination of the subsidiary fuel injection hole is great so that the swirl operates so as to push out the fuel through the subsidiary fuel injection hole. The fuel injected through the main fuel injection hole spreads due to the centrifugal force acting on the swirling fuel without depending on an intake gas swirl. The fuel injected through the subsidiary fuel injection hole has a strong penetrating force and can reach the vicinity of a spark plug. This improves ignition without depending on an intake gas swirl. Thus, good combustion is obtained over an entire operation range of a direct fuel injection type engine.

6 Claims, 4 Drawing Sheets

FUEL SWIRL GENERATION TYPE FUEL INJECTION VALVE AND DIRECT FUEL INJECTION TYPE SPARK IGNITION INTERNAL COMBUSTION ENGINE MOUNTED WITH THE FUEL INJECTION VALVE

BACKGROUND OF THE INVENTION

1. Field of the Invention

The present invention relates to a fuel swirl generation type fuel injection valve and a direct fuel injection type spark ignition internal combustion engine mounted with the fuel injection valve.

2. Description of the Related Art

Direct fuel injection type spark ignition internal combustion engines mounted with a fuel injection valve having a plurality of fuel injection holes are known, for example, in Japanese Patent Publications SHO No. 62-48916, SHO No. 62-121827 and SHO No. 61-167116; and Japanese Utility Model Publications SHO No. 62-87169 and SHO No. 62-87127, though those fuel injection valves are not fuel swirl generation types. Fuel swirl generation type fuel injection valves are known, for example, in Japanese Utility Model Publication SHO No. 58-29162, though it does not disclose how such a fuel injection valve is applied to a direct fuel injection type engine. Although Japanese Utility Model Publication SHO No. 61-171869 discloses a needle valve having grooves for generating fuel turbulence by causing the fuel flow flowing through the grooves to collide with a straight fuel flow, it can not be classified in a fuel swirl generation type.

In some of the direct fuel injection type engines, for example, in the engine of Japanese Patent Publication SHO No. 62-48916, the fuel injection valve is located close to the spark plug and has a main fuel injection hole and a subsidiary fuel injection hole. The main fuel injection hole injects fuel in the same direction as that of the intake gas swirl, and the subsidiary fuel injection hole injects fuel in a direction toward a portion of a wall surface of the combustion chamber located upstream of the spark plug in the intake gas swirl flow direction. Smooth ignition is obtained because the fuel injected through the subsidiary fuel injection hole and adhering to the combustion chamber wall surface is evaporated at the surface, the evaporation being assisted by the intake gas swirl and the fuel being conveyed by the swirl to the spark plug in a rich condition. On the other hand, because the fuel injected through the main fuel injection hole is scattered in the combustion chamber by the swirl, a combustion effectively using the air, that is, a combustion with a high air use rate is obtained. As will be understood from the above, the intake gas swirl is inevitable for promotion of fuel evaporation.

However, there exist some problems in the intake gas swirl assist engine. Namely, in the case where the swirl is weak, scattering of the fuel injected through the main fuel injection hole will be insufficient and it is difficult to obtain good combustion with a high air use rate. On the contrary, in the case where the swirl is strong, it is difficult to obtain good ignition, because the fuel evaporated at the combustion chamber wall surface and conveyed to the spark plug is excessively blown out by the strong swirl. In this instance, because a strength of the swirl changes corresponding to the intake gas amount and the engine speeds, it is very difficult to obtain both good ignition and good combustion over the entire engine operation range.

SUMMARY OF THE INVENTION

An object of the invention is to provide a fuel injection valve and a direct fuel injection type spark ignition engine mounted with the fuel injection valve that are capable of forming a well-combustible mixed gas, without depending on an intake gas swirl, created by two kinds of fuel injection holes, that is, main and subsidiary fuel injection holes, the main fuel injection hole performing fuel injection with a self-scattering characteristic and the subsidiary fuel injection hole performing fuel injection with a great penetrating characteristic.

The above-described object can be attained by a fuel swirl generation type fuel injection valve and a direct fuel injection type spark ignition internal combustion engine mounted with the fuel swirl generation type fuel injection valve in accordance with the present invention.

The fuel swirl generation type fuel injection valve includes:

an injector assembly defining an injector axis and including an injector body and a valve member movable along the injector axis relative to the injector body;

means for generating a fuel swirl in fuel flowing through the injector assembly;

first orifice means located downstream of the fuel swirl generating means for injecting fuel therethrough, the first orifice fuel injecting means comprising a main fuel injection hole having a comparatively large diameter and extending at a comparatively small first inclination angle including 0° with respect to the injector axis; and second orifice means located downstream of the fuel swirl generating means for injecting fuel therethrough, the second orifice fuel injecting means comprising a subsidiary fuel injection hole having a comparatively small diameter smaller than the diameter of the main fuel injection hole and extending at a comparatively large second inclination angle larger than the first inclination angle of the main fuel injection hole with respect to the injector axis.

The fuel swirl generating means may be formed on an inside surface of the main fuel injection hole.

The fuel swirl generating means can be substituted for fuel spreading means formed at a lower end portion of the valve member. The fuel injection valve having the fuel spreading means will be called a fuel spreading type fuel injection valve hereinafter.

The direct fuel injection type spark ignition internal combustion engine mounted with a fuel swirl generation type fuel injection valve, includes:

a piston, cylinder and cylinder head structure including a cylinder, a piston reciprocally movable in the cylinder, and a cylinder head; the cylinder, the piston and the cylinder head defining a combustion chamber therein; the cylinder head including a projection protruding into the combustion chamber;

a spark plug, coupled to the cylinder head, for igniting fuel; and a fuel swirl generation type fuel injection valve, coupled to the cylinder head and located on an opposite side of the spark plug with respect to the projection of the cylinder head, for directly injecting fuel into the combustion chamber, the fuel injection valve including:

an injector assembly defining an injector axis and including an injector body and a valve member movable relative to the injector body;

means for generating a fuel swirl in the fuel flowing through the injector assembly;

first orifice means located downstream of the fuel swirl generating means for injecting fuel therethrough, the first orifice fuel injecting means comprising a main fuel injection hole having a comparatively large diameter and extending at a comparatively small first inclination angle including 0° with respect to the injector axis, the main fuel injection hole being directed so as to inject fuel in a direction toward the piston; and second orifice means located downstream of the fuel swirl generating means for injecting fuel therethrough, the second orifice fuel injecting means comprising a subsidiary fuel injection hole having a comparatively small diameter smaller than the diameter of the main fuel injection hole and extending at a comparatively large second inclination angle larger than the first inclination angle of the main fuel injection hole with respect to the injector axis, the subsidiary fuel injection hole being directed so as to inject fuel in a direction toward the spark plug and onto the projection of the cylinder head.

The fuel swirl generating means of the fuel injection valve mounted to the internal combustion engine may be formed on the inside surface of the main fuel injection hole.

The fuel swirl generation type fuel injection valve mounted to the direct fuel injection type spark ignition internal combustion engine may be substituted for a fuel spreading type fuel injection valve.

Two subsidiary fuel injection holes may be provided. One of the subsidiary fuel injection holes injects fuel on one side of a connecting line connecting the injector axis and an axis of the spark plug, and the other subsidiary fuel injection hole injects fuel on the other side of the connecting line.

In the fuel injection valve and the engine, the inclination of the main fuel injection hole with respect to the axis of the fuel swirl is small, so that the fuel injected through the main fuel injection hole spreads in a cone-like pattern after passing through the hole, because a centrifugal force due to the fuel swirl acts on the fuel flowing in the fuel injection valve. Due to this fuel spreading, the injected fuel is sufficiently atomized and mixed with the air introduced into the combustion chamber to thereby form a nearly evenly mixed gas in the combustion chamber. Due to this sufficiently mixed gas, good combustion with a high air use rate is obtained without depending on an intake gas swirl. On the other hand, because the inclination of the subsidiary fuel injection hole is great, the centrifugal force of the swirling fuel flowing in the fuel injection valve only operates in such a manner as to push out the fuel through the subsidiary fuel injection hole. Thus, the fuel injected through the subsidiary fuel injection hole flows in a needle-like pattern with a strong penetrating characteristic toward the portion of the cylinder head adjacent the spark plug to thereby supply a sufficient amount of fuel to the vicinity of the spark plug without depending on an intake gas swirl. As a result, both good ignition and good combustion for enabling high engine power operation are obtained over entire engine load conditions without depending on an intake gas swirl.

BRIEF DESCRIPTION OF THE DRAWINGS

The above and other objects, features and advantages of the present invention will become apparent and more readily appreciated from the following detailed description of the preferred exemplary embodiments of the invention taken in conjunction with the accompanying drawings, in which.

DETAILED DESCRIPTION OF THE PREFERRED EMBODIMENTS

Figure 1:
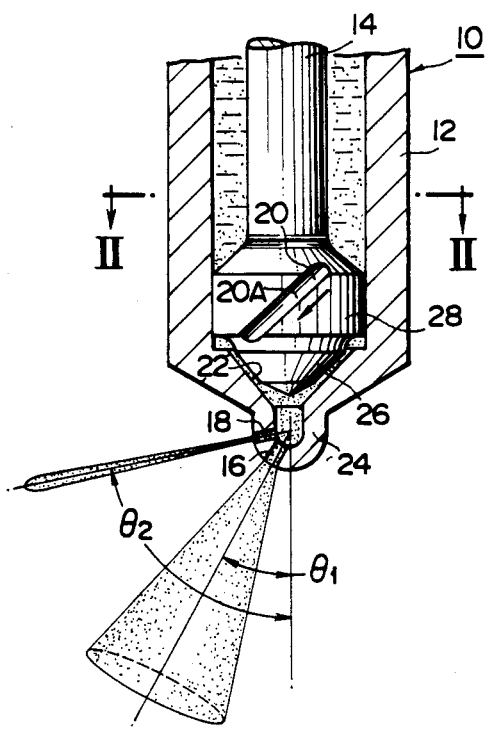
FIG. 1 is a cross-sectional view of a lower end portion of a fuel swirl generation type fuel injection valve in accordance with a first embodiment of the present invention.

The present invention relates to a fuel injection valve capable of performing good combustion and ignition without depending on an intake gas swirl, and a direct fuel injection type spark ignition internal combustion engine mounted with the fuel injection valve. With respect to the fuel injection valve, five embodiments will be explained, and FIGS. 1 and 2, FIG. 3, FIG. 4, FIG. 5 and FIG. 6 illustrate the first, second, third, fourth, and fifth embodiments, respectively. With respect to the internal combustion engine, three embodiments will be explained, and FIGS. 7-9, FIG. 10, and FIG. 11 illustrate the sixth, seventh, and eighth embodiments, respectively. Because the features of each fuel injection valve exist in the structures of the lower end portion thereof, each of FIGS. 1-6 illustrates only the lower end portion of the fuel injection valve. Also, because the features of each internal combustion engine exist in the structures of a portion adjacent a combustion chamber, each of FIGS. 7-11 illustrates only the portion adjacent the combustion chamber. Through all FIGS. 1-11, portions common with respect to every embodiment are denoted with the same reference numerals.

Figure 2:
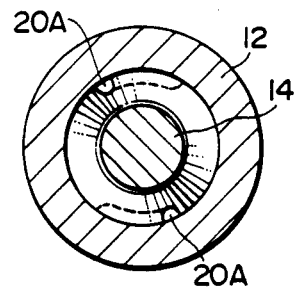
FIG. 2 is a cross-sectional view of the fuel injection valve of FIG. 1 taken along line II—II.

Firstly, a fuel injection valve in accordance with the first embodiment will be explained with reference to FIGS. 1 and 2. A fuel injection valve 10 includes an injector assembly of an injector body 12 and a valve member 14 movable relative to injector body 12 along an axis of the injector assembly. Fuel injection valve 10 further includes a fuel swirl generation device 20 for generating a fuel swirl in a fuel flowing therethrough. Because of the provision of fuel swirl generation device 20, fuel injection valve 10 of the first embodiment can be called a swirl generation type fuel injection valve. Fuel injection valve 10 further includes two kinds of fuel injection holes for injecting fuel therethrough, more particularly, a main fuel injection hole 16 and a subsidiary fuel injection hole 18. Main fuel injection hole 16 is located downstream of fuel swirl generation device 20 and comprises a hole having a comparatively large diameter and extending at a comparatively small inclination angle $\theta_1$ including 0° with respect to an axis of fuel injection valve 10, that is, the injector axis. Subsidiary fuel injection hole 18 comprises a hole having a comparatively smaller diameter than the diameter of main fuel injection hole 16 and extending at a comparatively larger inclination angle $\theta_2$ than the angle of main fuel injection hole 16 with respect to the axis of fuel injection valve 10. Main fuel injection hole 16 injects more fuel than subsidiary fuel injection hole 18 and assures a high power of the engine, and subsidiary fuel injection hole 18 assures a good ignition of the engine.

Injector body 12 includes a valve seat 22 for opening an closing fuel injection valve 10 in cooperation with a tapered portion 26 of valve member 14 and a sack portion 24 for receiving therein a fuel having passed through a clearance between valve seat 22 and tapered portion 26 of valve member 14. Sack portion 24 is located downstream of valve seat 22 and, more particularly, at a lower end portion of injector body 12. Sack portion 24 is decreased in diameter in comparison with a remaining, upper portion of injector body 12 and has a cylindrical wall connected to the upper portion and a substantially semi-spherical wall connected to the cylindrical wall. Main and subsidiary fuel injection holes 16 and 18 are formed in sack portion 24 so as to penetrate the wall of sack portion 24. Preferably, the main fuel injection hole 16 is formed in the semi-spherical wall of sack portion 24 and the subsidiary fuel injection hole 18 is formed in the cylindrical wall of sack portion 24.

In the first embodiment, swirl generation device 20 comprises a plurality of helical grooves 20A formed in valve member 14. Helical grooves 20A form, in cooperation with an inside surface of injector body 12, fuel paths for causing a substantially entire amount of a fuel flowing in fuel injection valve 10 to flow therethrough. More particularly, valve member 14 includes a cylindrical portion 28 upstream of tapered portion 26 and helical grooves 20A are formed at the cylindrical outer surface of cylindrical portion 28 of valve member 14 so as to helically extend from an upstream end to a downstream end of cylindrical portion 28.

Preferably, the angle $\theta_1$ defined between the axis of the main fuel injection hole 16 and the axis of the fuel injection valve 10 is less than 35° so that a sufficient swirl remains in the fuel injected through the main fuel injection hole 16 without being weakened when passing through the main fuel injection hole 16. The reason of the angle of 35° is that the fuel swirl would be seriously weakened at angles greater than 40°. On the contrary, the angle $\theta_2$ defined between the axis of the subsidiary fuel injection hole 18 and the axis of fuel injection valve 10 is preferably greater than 45° so that the fuel swirl within sack portion 24 effectively operates to push out the fuel through the subsidiary fuel injection hole 18

Structures of other portions of fuel injection valve 10 are the same as those of a conventional fuel injection valve. For example, valve member 14 is operated so as to move relative to injector body 12 by an electro-magnetic actuator. Such an actuator may be a piezo-type actuator and a oil pressure driven type actuator. However, because such structures are known ones and the present invention does not relate to such structures, explanations about the known structures will be omitted.

Figure 3:
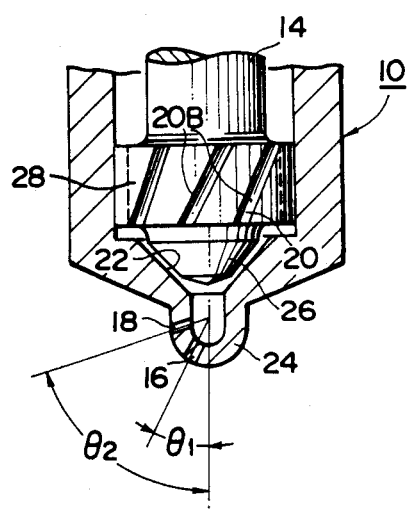
FIG. 3 is a cross-sectional view of a lower end portion of a fuel swirl generation type fuel injection valve in accordance with a second embodiment of the present invention.

FIG. 3 illustrates the second embodiment where only the structure of the fuel swirl generation device is different from that of the first embodiment. Because structures except the fuel swirl generation device are the same as those of the first embodiment, only the fuel swirl generation device will be explained. Fuel swirl generation device 20 comprises a plurality of helically extending projections 20B formed in valve member 14 at the outside surface of cylindrical portion 2 of valve member 14. The diameter of the cylindrical portion 28 of the valve member 14 in FIG. 3 is decreased relative t the diameter of the cylindrical portion 28 in FIG. 1, so that the injector body 12 can accommodate movement of the valve body 14. Projections 20B form therebetween in cooperation with the inside surface of injector body 12, fuel paths for causing substantially the entire amount of the fuel flowing in fuel injection valve 12 t flow therethrough.

Figure 4:
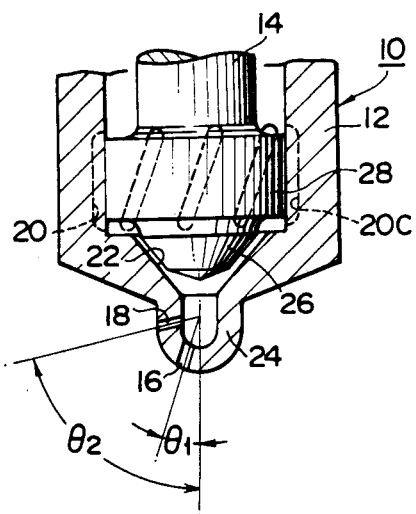
FIG. 4 is a cross-sectional view of a lower end portion of a fuel swirl generation type fuel injection valve in accordance with a third embodiment of the present invention.

FIG. 4 illustrates the third embodiment where only the structure of the fuel swirl generation device is different from that of the fuel swirl generation device of the first embodiment. Because structures except the fuel swirl generation device are the same as those of the first embodiment, only the fuel swirl generation device will be explained. Fuel swirl generation device 20 comprises a plurality of helical grooves 20C formed in injector body 12 at the inside surface of injector body 12. Grooves 20C helically extend from a position upstream of the upper end of cylindrical portion 28 of valve member 14 to a position downstream of the lower end of cylindrical portion 28 of valve member 14 and form, in cooperation with the outside surface of cylindrical portion 28 of valve member 14, fuel paths for causing an entire amount of the fuel flowing in fuel injection valve 10 to flow therethrough.

Figure 5:
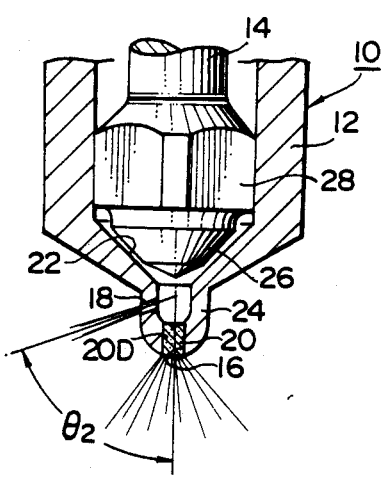
FIG. 5 is a cross-sectional view of a lower end portion of a fuel swirl generation type fuel injection valve in accordance with a fourth embodiment of the present invention.

FIG. 5 illustrates the fourth embodiment where only the structure of the fuel swirl generation device and the location thereof in fuel injection valve 10 are different from those of the fuel swirl generation device of the first embodiment. Because structures except the fuel swirl generation device and the location thereof are the same as those of the first embodiment, only the fuel swirl generation device and the location thereof will be explained. Fuel swirl generation device 20 comprises a plurality of helical grooves 20D formed in sack portion 24 of injector body 12 at an inside surface of main fuel injection hole 16. Grooves 20D helically extend from an upstream end of main fuel injection hole 16 to a downstream end of main fuel injection hole 16 and generate a fuel swirl in the fuel flowing through main fuel injection hole 16. The fuel swirl is firstly generated in a radially outer portion of the fuel and the generated fuel swirl is gradually transmitted to a radially inner portion of the fuel when the fuel flows in a downstream direction to thereby bring almost all portions of the fuel into a swirling condition. As apparent from the above, fuel swirl device 20 of helical grooves 20D is located downstream of valve seat 22. Main fuel injection hole 16 may or may not extend in parallel with the axis of fuel injection valve 10.

Figure 6:
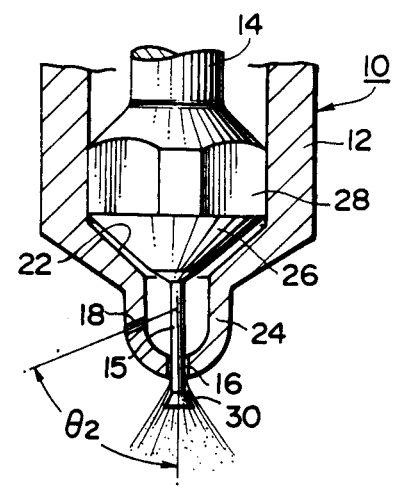
FIG. 6 is a cross-sectional view of a lower end portion of a fuel spreading type fuel injection valve in accordance with a fifth embodiment of the present invention.

FIG. 6 illustrates another type of, that is, a fuel spreading type, fuel injection valve in accordance with the fifth embodiment of the present invention. In the embodiment, the fuel swirl generation device 20 of each of the first through fourth embodiments is replaced by a fuel spreading device 30. Because structures of the fifth embodiment are the same as those of the first embodiment except fuel spreading device 30 and the location thereof in fuel injection valve 10, only fuel spreading device 30 and the location thereof will be explained. A lower end portion of valve member 14 includes a rod member 15 which extends through main fuel injection hole 16 and a fuel spreading device 30 is formed at the lower end portion of the rod member 15 of the valve member 14. More specifically, the lowermost portion of the rod member 15 of the valve member 14 is tapered so as to spread in shape or increase in diameter in a downstream direction and the tapered portion constitutes the fuel spreading device 30. The fuel injected through main fuel injection hole 16 contacts and is spread by fuel spreading device 30. In this embodiment, main fuel injection hole 16 has to extend in parallel with the axis of fuel injection valve 10.

Next, direct fuel injection type spark ignition internal combustion engines in accordance with the sixth through eighth embodiments of the present invention mounted with any one of the swirl generation type fuel injection valves in accordance with the first through fourth embodiments of the present invention or the fuel spreading type fuel injection valve in accordance with the fifth embodiment of the present invention will be explained with reference to FIGS. 7-11. Because the particular structures of the fuel swirl generation type fuel injection valves and the fuel spreading type fuel injection valve were discussed above, as to the structures of the fuel injection valves, only portions thereof necessary to understand relationships between the direct fuel injection type engines and the fuel injection valves will be explained in the following explanation of the direct fuel injection type engines.

Figure 7:
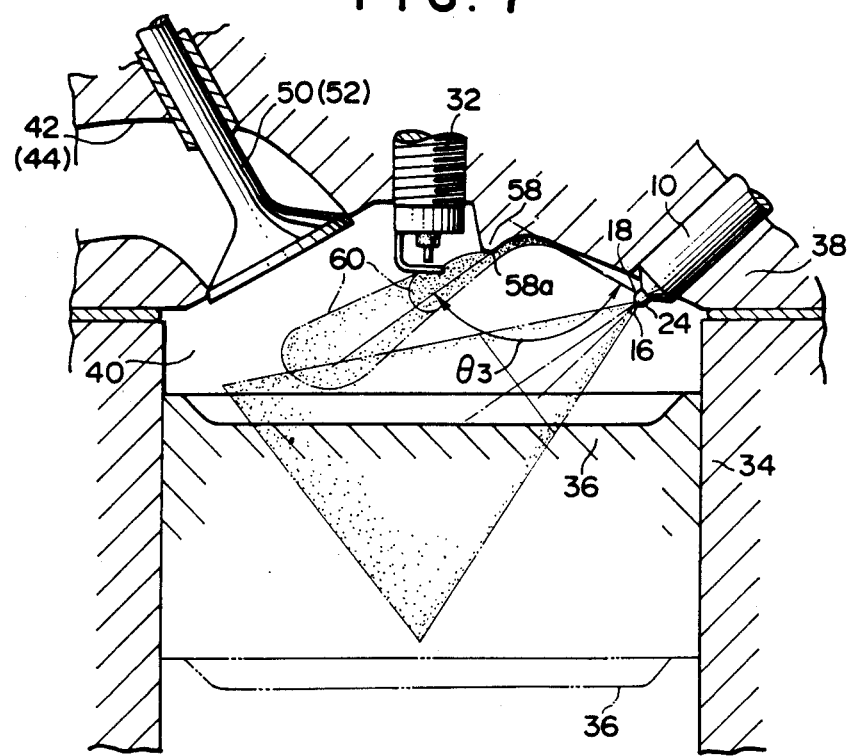
FIG. 7 is a cross-sectional view of a portion adjacent a combustion chamber of a direct fuel injection type spark ignition internal combustion engine mounted with a fuel swirl generation type fuel injection valve or a fuel spreading type fuel injection valve in accordance with a sixth embodiment of the present invention.
Figure 8:
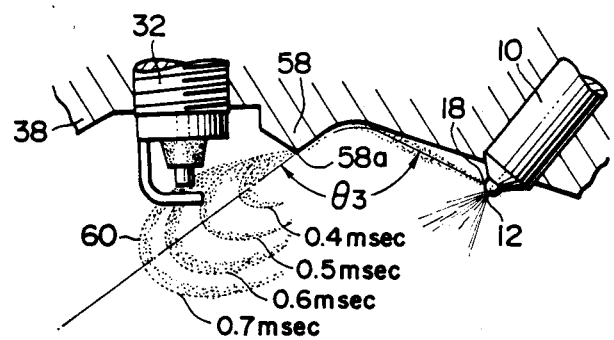
FIG. 8 is an enlarged cross-sectional view of a portion adjacent a projection of the internal combustion engine of FIG. 7.
Figure 9:
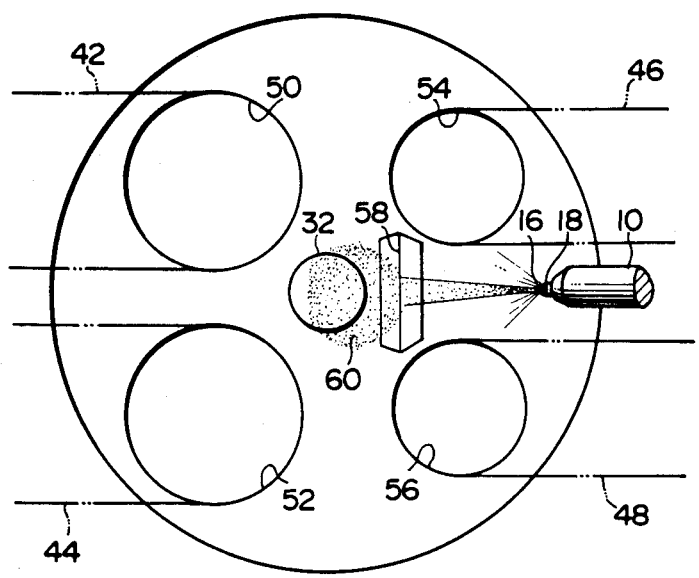
FIG. 9 is a plan view of a cylinder head portion of the internal combustion engine of FIG. 7.

FIGS. 7-9 illustrate the sixth embodiment in accordance with the present invention. The engine generally includes a piston, cylinder and cylinder head structure, a spark plug 32, and the fuel swirl generation type fuel injection valve 10 discussed above with reference to FIGS. 1-5 or the fuel spreading type fuel injection valve discussed above with reference to FIG. 6. The piston, cylinder and a cylinder head structure includes a cylinder 34, a piston 36 reciprocally movable in cylinder 34, and a cylinder head 38. Cylinder 34, piston 35 and cylinder head 38 define a combustion chamber 40. Intake ports 42 and 44 and exhaust ports 46 and 48 are formed in cylinder head 38. Intake valves 50 and 52 are provided at open ends of intake ports 42 and 44, and exhaust valves 54 and 56 are provided at open ends of exhaust ports 46 and 48. Cylinder head 38 further includes a projection 58 protruding into combustion chamber 40. Spark plug 32 for igniting fuel including evaporated fuel is coupled to cylinder head 38. Preferably, spark plug 32 is located at a position close to an axis of cylinder 34. Fuel injection valve 10 is coupled to cylinder head 38 and is located on an opposite side of spark plug 32 with respect to projection 58 of cylinder head 38 so as to directly inject fuel into combustion chamber 40. Main fuel injection hole 16 is directed so as to inject fuel in a direction toward piston 36. Subsidiary fuel injection hole 18 is directed so as to inject fuel in a direction toward a contact surface of projection 58 of cylinder head 38. Projection 58 operates so as to atomize the fuel due to the collision of the fuel with the surface of projection 58 as well as operates to guide the atomized fuel below spark plug 32. More particularly, as shown in FIG. 7, an extension of the surface, opposite to fuel injection valve 10 of projection 58 of cylinder head 38 passes a little below spark plug 32. Because of this structure, the atomized fuel is prevented from excessively and directly flowing through an ignition gap of spark plug 32. As shown in FIG. 8, the atomized fuel having left projection 58 and flowing toward spark plug 32 is gradually spread and evaporated to form a comparatively rich mixed gas layer 60 after a certain lapse of time. An upper portion of the rich mixed gas layer 60 contacts or flows into the ignition gap of spark plug 32 to thereby make the ignition reliable without causing smoking. As shown in FIG. 7, a lowermost portion 58a of projection 58 is edged so as to cause the fuel having flown along the surface of projection 58 to the portion 58a to reliably leave projection 58 at the edged portion 58a. As shown in FIG. 7, an angle $\theta_3$ defined between the axis of subsidiary fuel injection hole 18 and the surface, opposing fuel injection valve 10, of projection 58 is greater than 90°. The reason is that if the angle 58 were smaller than 90°, an excessively undercut portion would be formed on the surface of projection 58 and one portion of the fuel would collect in such an excessively undercut portion. In the sixth embodiment, fuel injection valve 10 is inclined with respect to the axis of cylinder 34 so as to inject fuel toward piston 36 when piston 36 is at a comparatively high position.

Figure 10:
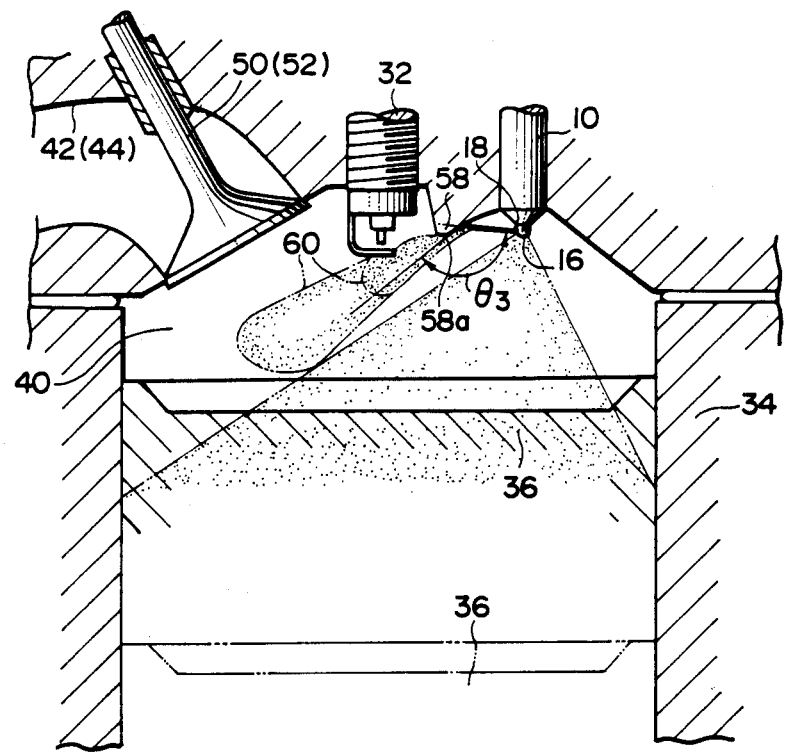
FIG. 10 is a cross-sectional view of a portion adjacent a combustion chamber of a direct fuel injection type spark ignition internal combustion engine in accordance with a seventh embodiment of the present invention.

FIG. 10 illustrates the seventh embodiment where fuel injection valve 10 extends substantially in parallel with the axis of cylinder 34. Other structures are the same as those of the sixth embodiment. Due to the parallel arrangement of fuel injection valve 10, it is possible to begin fuel injection at an early time where piston 34 is not at a high position, because the fuel injected through main fuel injection hole 16 flows toward piston 36 at almost all positions of piston 36. This increases freedom in the design of fuel injection timing.

Figure 11:
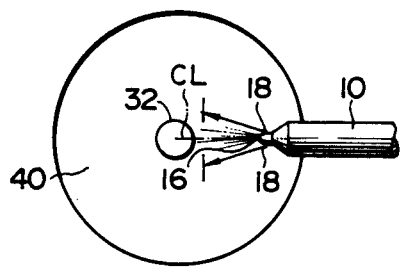
FIG. 11 is a plan view of a cylinder head portion of a direct fuel injection type spark ignition internal combustion engine mounted with a fuel swirl generation type fuel injection valve or a fuel spreading type fuel injection valve in accordance with an eighth embodiment of the present invention.

FIG. 11 illustrates the eighth embodiment of the present invention where two subsidiary fuel injection holes 18 are provided. Other structures are the same as those of the sixth embodiment. In the eighth embodiment, one of subsidiary fuel injection holes 18 is directed so as to inject fuel in a direction toward one side of a line CL connecting the axis of fuel injection valve 10 and an axis of spark plug 32 and the other of subsidiary fuel injection holes 18 is directed so as to inject fuel in a direction toward the other side with respect to the connecting line CL.

Next, operation of fuel injection valve 10 and the direct fuel injection type engine in accordance with the present invention will be explained.

In the fuel injection valve and the engine, the inclination angle $\theta_1$ (see e.g., FIG. 1) of main fuel injection hole 16 with respect to the axis of the fuel swirl formed in sack portion 24 is small, so that the fuel injected through main fuel injection hole 16 spreads in a cone-like pattern because a centrifugal force acts on the fuel flowing in fuel injection valve 10 and the fuel is radially outwardly biased due to the centrifugal force. Du to this fuel spreading, the mixed gas in the combustion chamber is brought to a nearly even state and good combustion with a high air use rate is obtained without depending on an intake gas swirl. On the other hand, because the inclination angle $\theta_2$ of subsidiary fuel injection hole 18 is great, the centrifugal force acting on the swirling fuel flowing in sack portion 24 operates only in such a manner as to push out the fuel through subsidiary fuel injection hole 18. Thus, the fuel injected through subsidiary fuel injection hole 18 flows in the combustion chamber in a needle-like pattern with a strong penetrating force onto the surface of projection 58 of cylinder head 38 adjacent spark plug 32. The fuel is sufficiently atomized due to the collision with the surface of projection 58 and further flows slightly below spark plug 32. An upper portion of the atomized fuel is evaporated and flows to the ignition gap of spark plug 32 to thereby supply the comparatively rich mixed gas to the ignition gap of spark plug 32 without depending on an intake gas swirl. This enables good ignition and has a great advantage especially in a low engine load operation. Thus, both good ignition and good combustion for enabling a high engine power operation are obtained over entire engine load conditions without depending on an intake gas swirl.

According to the present invention, the following effects are obtained.

Due to the spreading of the fuel due to main fuel injection hole 16, a sufficiently mixed gas is formed in the combustion chamber and a good combustion with a high air use rate is obtained without depending on a fuel evaporation assisted by an intake gas swirl. Also, due to the strong penetration of the fuel due to subsidiary fuel injection hole 18, fuel is sufficiently supplied to spark plug 32 and a good ignition is obtained without being assisted by an intake gas swirl for conveyance of a fuel to a spark plug.

Due to the above-described spreading, the penetrating force of the fuel injected through main fuel injection hole 16 is not great. Thus, in the case where the amount of fuel injection is small such as in a low engine load operation, a flow reaching distance of the injected fuel is comparatively small and an excessive scattering of the fuel to all portions of the combustion chamber will be suppressed to thereby enable to form a rich mixed gas layer around the ignition plug and to obtain a good combustion at low engine loads.

Due to the combustion independent of an intake gas swirl, there is no necessity to strengthen an intake gas swirl by means of a swirl generation port. This decreases flow resistance in the intake ports and increases intake gas amount.

Although only several preferred embodiments of the invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A fuel swirl generation type fuel injection valve comprising:
   an injector assembly defining an injector axis and including an injector body and a valve member movable along the injector axis relative to the injector body;
   means for generating a fuel swirl in fuel flowing through the injector assembly;
   first orifice means located downstream of the fuel swirl generating means for injecting fuel therethrough, the first orifice fuel injecting means comprising a main fuel injection hole having a comparatively large first diameter and extending at a comparatively small first inclination angle including 0° with respect to the injector axis; and
   second orifice means located downstream of the fuel swirl generating means for injecting fuel therethrough, the second orifice fuel injecting means comprising a subsidiary fuel injection hole having a comparatively small second diameter smaller than the first diameter of the main fuel injection hole and extending at a comparatively large second inclination angle larger than the first inclination angle of the main, fuel injection hole with respect to the injector axis, said first and second orifices being operated simultaneously.

2. The fuel injection valve according to claim 1, further comprising a sack portion located at a lower end portion of the injector body, the sack portion including a cylindrical wall and a substantially semi-spherical wall connected to the cylindrical wall, the main fuel injection hole being formed in the substantially semi-spherical wall and the subsidiary fuel injection hole being formed in the cylindrical wall.

3. The fuel injection valve according to claim 1, wherein the first inclination angle between an axis of the main fuel injection hole and the injector axis is less than 35° and the second inclination angle between an axis of the subsidiary fuel injection hole and the injector axis is greater than 45°.

4. The fuel injection valve according to claim 1, wherein the swirl generating means comprises a plurality of helical grooves formed in the valve member, the helical grooves forming, in cooperation with an inside surface of the injector body, fuel paths for causing substantially all of the fuel flowing in the injector assembly to flow therethrough.

5. The fuel injection valve according to claim 1, wherein the fuel swirl generating means comprises a plurality of helically extending projections formed on the valve member, the projections forming therebetween, in cooperation with an inside surface of the injector body, fuel paths for causing substantially all of the fuel flowing in the injector assembly to flow therethrough.

6. The fuel injection valve according to claim 1, wherein the fuel swirl generating means comprises a plurality of helical grooves formed in the injector body, the grooves forming, in cooperation with an outside surface of the valve member, fuel paths for causing substantially all of the fuel flowing in the injector assembly to flow therethrough.

* * * * *